United States Patent
Kraft et al.

(10) Patent No.: US 9,789,577 B2
(45) Date of Patent: Oct. 17, 2017

(54) COUNTERBALANCE SYSTEM FOR UPPER HORIZONTAL SURFACE DRILLING OPERATIONS

(71) Applicant: The Boeing Company, Chicago, IL (US)

(72) Inventors: Jerome C. Kraft, Snohomish, WA (US); Andrew P. Newton, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/010,580

(22) Filed: Jan. 29, 2016

(65) Prior Publication Data

US 2017/0216985 A1    Aug. 3, 2017

(51) Int. Cl.
*B23B 45/14* (2006.01)
*B23Q 9/00* (2006.01)
(Continued)

(52) U.S. Cl.
CPC .......... *B23Q 9/0028* (2013.01); *B23B 45/001* (2013.01); *B25H 1/0078* (2013.01);
(Continued)

(58) Field of Classification Search
CPC .. B25H 1/0078; B25H 1/0021; B25H 1/0042; B25H 1/0064; B27C 5/10; B27C 9/005; B23Q 9/007; B23Q 9/0028; B23Q 9/0007
(Continued)

(56) References Cited

U.S. PATENT DOCUMENTS 2,360,942 A * 10/1944 Ellerstein ............ B25H 1/0078
408/112
2,622,458 A * 12/1952 Jenkins ................ B25H 1/0078
408/112
(Continued)

FOREIGN PATENT DOCUMENTS

CH      566836 A   *  9/1975
DE      1602786        11/1970
(Continued)

OTHER PUBLICATIONS www.novator.eu/news/novator-wins-order-for-airbus-a350-xwb-p_133; Novator the Orbital Drilling Company, accessed by Applicant on Nov. 12, 2015.
(Continued)

*Primary Examiner* — Daniel Howell
(74) *Attorney, Agent, or Firm* — Joseph M. Rolnicki; Evans & Dixon, L.L.C.

(57) ABSTRACT

A counterbalance system employs one or more springs to support a large motor drill on an upper horizontal work surface, for example on the tops of drill jigs or bushings. The counterbalance system supports the drill above the work surface where the counterbalance system can slide across the work surface to selectively position the drill over a drill bushing through which a drilling operation is to be performed. A user of the drill supported on the counterbalance system can then push downwardly on the drill to compress the spring and perform a drilling operation. On removal of the downward directed force exerted by the user of the drill, the spring pushes the drill upwardly to disengage the drill from the work surface. The user of the counterbalance system can then slide the counterbalance system and the drill across the top of the work surface.

20 Claims, 8 Drawing Sheets

(51) Int. Cl.
*B23B 45/00* (2006.01)
*B25H 1/00* (2006.01)

(52) U.S. Cl.
CPC ..... *B23B 2215/04* (2013.01); *B23B 2260/136* (2013.01); *B25H 1/0064* (2013.01)

(58) Field of Classification Search
USPC .......................... 144/136.95, 154.5; 409/182
See application file for complete search history.

(56) References Cited

U.S. PATENT DOCUMENTS

| | | | | | |
|---|---|---|---|---|---|
| 2,727,412 | A | * | 12/1955 | Hatcher | B25H 1/0078 408/235 |
| 2,837,939 | A | | 6/1958 | Leitner et al. | |
| 2,997,900 | A | * | 8/1961 | Pugsley | B25H 1/0021 144/1.1 |
| 3,096,798 | A | * | 7/1963 | Pugsley | B27C 9/005 144/1.1 |
| 3,708,238 | A | * | 1/1973 | Kissane | B25H 1/0078 408/112 |
| 3,958,893 | A | * | 5/1976 | Boyajian | B25H 1/0042 408/112 |
| 4,179,231 | A | * | 12/1979 | Hadden | B25H 1/0064 408/110 |
| 4,279,552 | A | * | 7/1981 | Epstein | B25H 1/0078 408/112 |
| 4,349,301 | A | * | 9/1982 | Boyajian | B25H 1/0042 29/560 |
| 4,484,608 | A | * | 11/1984 | Ferdinand | B23Q 1/58 144/135.3 |
| 4,652,191 | A | * | 3/1987 | Bernier | B27C 5/10 144/136.95 |
| 5,829,931 | A | * | 11/1998 | Doumani | B23B 49/006 144/251.1 |
| 6,971,824 | B2 | * | 12/2005 | Blankenship | B23B 47/28 408/3 |
| 2006/0147284 | A1 | | 7/2006 | Kim | |
| 2009/0145520 | A1 | * | 6/2009 | Opsitos, Jr. | B23B 45/02 144/108 |

FOREIGN PATENT DOCUMENTS

| | | | | |
|---|---|---|---|---|
| DE | 2626945 | | 12/1977 | |
| DE | 3105490 | A1 * | 10/1982 | |
| EP | 255120 | A1 * | 2/1988 | |
| FR | 2793175 | A3 * | 11/2000 | |
| GB | 2299285 | | 10/1996 | |
| GB | 2299285 | A * | 10/1996 | B23B 49/006 |
| GB | 2393675 | A * | 4/2004 | B23B 49/006 |
| JP | H10175107 | | 6/1998 | |
| SU | 1321532 | A1 * | 7/1987 | |

OTHER PUBLICATIONS www.equipoisinc.com; Exoskeletal Arm Technology for Ergonomics Safety and Productivity, accessed by Applicant on Nov. 12, 2015.
www.toolbalancearms-3arm.com, accessed by Applicant on Nov. 12, 2015.
www.endo-kogyo.co.jp/english/esb; Spring Balancers, accessed by Applicant on Nov. 12, 2015.
Extenden Search Report dated Jun. 19, 2017 issued in co-pending EP Application No. 17151453.2-1709.

* cited by examiner

COUNTERBALANCE SYSTEM FOR UPPER HORIZONTAL SURFACE DRILLING OPERATIONS

FIELD

This disclosure pertains to a counterbalance system that employs one or more springs to support a large motor drill on an upper horizontal work surface, for example on the tops of drill jigs or bushings. The spring has a spring force that supports the drill at a position above the work surface that enables the drill to slide across the work surface to selectively position the drill over a drill bushing through which a drilling operation is to be performed. The force of the spring allows a user of a drill supported on the counterbalance system to push downwardly on the drill and compress the spring when performing a drilling operation at a first position of the drill relative to the work surface. On removal of the downward directed force exerted by the user of the drill, the spring pushes the drill upwardly to disengage the drill from the work surface. The user of the counterbalance system can then slide the counterbalance system and the drill across the top of the work surface to other positions on the work surface where drilling operations are to be performed.

BACKGROUND

Large motor drills, for example orbital drills, are used in the aircraft construction industry to drill holes in horizontal surfaces of aircraft components. Examples of such aircraft horizontal surfaces include upper wing surfaces, upper horizontal stabilizer surfaces, fuselage crown surfaces, floor surfaces, etc. The large motor drills used for drilling holes in the horizontal surfaces can weigh as much as 50 pounds (22.6 kilograms). An operator of the drill may lift the drill weight between each hole drilled. Operators are at times in a kneeling position when drilling these holes. The repetitive lifting of the drill by the operator of the drill may create ergonomic issues.

Counterbalance arms have been used to assist the operator of a large motor drill in lifting the drill. In the construction of a typical counterbalance arm, one end is connected to the drill and the opposite end is mounted to a hard structure of the aircraft assembly area, for example a structural frame member of an aircraft assembly building. However, the construction of an aircraft assembly building does not always support requirements for a counterbalance arm to be mounted to a structure of the building. Additionally, counterbalance arms are set up to enable the performance of a particular drilling operation, and then removed when the drilling operation is completed or a new drilling operation is to be performed. This adds to the cycle time of performing drilling operations on a particular component of an aircraft construction. Also, counterbalance arms may be relatively expensive. Furthermore, employing a counterbalance arm to assist in performing a particular drilling operation on a particular component of an aircraft construction can significantly increase the operating footprint, or the area of the aircraft where an operator is performing a drilling operation. This can negatively impact a particular drilling operation cycle time when multiple operators must work within a limited space or area of the aircraft being constructed.

Counterbalance reels have also been employed to support or suspend large motor drills above an area of an aircraft construction where a particular drilling operation is to take place. However, counterbalance reels require overhead support, for example an overhead structure of an aircraft assembly building to react the load or support the weight of the large motor drill. This may not be a viable option when performing drilling operations in upper horizontal surfaces of aircraft components. Additionally, like the counterbalance arms, counterbalance reels require additional set up time and tear down time, which negatively impacts the cycle time of performing a particular drilling operation.

SUMMARY

The counterbalance system of this disclosure includes an apparatus and its method of use in performing cutting or drilling operations in an upper horizontally oriented surface of an aircraft component, for example an upper wing surface, an upper horizontal stabilizer surface, a fuselage crown surface, a floor surface, etc.

The apparatus includes a base plate that has a flat bottom surface. The flat bottom surface of the base plate facilitates the sliding movement of the base plate across the horizontally oriented work surface into which cutting operations are being performed, for example over the top surfaces of drill jigs or bushings or over the top surface of an aircraft component.

A central hole extends through the base plate. The central hole is configured to accommodate a cutting tool, for example a cutting bit that moves vertically through the central hole relative to the base plate when performing a cutting operation.

A top surface of the base plate extends around the central hole. The top surface can extend completely around the central hole, or around only a portion of the central hole.

A plurality of coil springs are fixed to the top surface of the base plate. The coil springs extend upwardly from the top surface along a line that is perpendicular to the bottom surface of the base plate. Each of the coil springs extends upwardly from the top surface to a top end of the coil spring.

A body is fixed to the top ends of the coil springs. The body has a support surface that is configured to support a cutting tool on the support surface, such as a large motor drill.

An alignment device is provided between the base plate and the body. In the counterbalance system of this disclosure, the alignment device is provided by a plurality of guide rods that extend upwardly from the top surface of the base plate. The guide rods extend through the body, mounting the body on the guide rods for reciprocating movements of the body on the guide rods. The guide rods maintain alignment of the body with the base plate during reciprocating movements of the body relative to the base plate.

The coil springs, when not compressed position and hold the body in a first position of the body relative to the base plate where the body is spaced a first distance from the base plate. The coil springs, when compressed in response to a downward directed load exerted on the body, position and hold the body in a second position of the body relative to the base plate where the body is spaced a second distance from the base plate. The second distance is smaller than the first distance.

The support surface of the body and the coil springs are configured to support a cutting tool on the support surface at the first position of the body relative to the base plate with the coil springs not being compressed. The support surface of the body and the coil springs are configured to support the cutting tool on the support surface at the second position of the body relative to the base plate in response to a downward directed load exerted on the cutting tool that exerts the downward directed load on the body and compresses the coil springs.

In use of the counterbalance system, the bottom surface of the base plate is positioned on a work surface of an aircraft component where a cutting operation is to be performed. For example, the bottom surface of the base plate could be positioned on the tops of drill jigs or bushings through which a cutting operation is to be performed on a surface of an aircraft component. Alternatively, the bottom surface of the base plate could be positioned on the surface of the aircraft component into which a cutting operation is to be performed.

A cutting tool, such as an orbital power feed drill motor, is then positioned on and supported by the support surface of the body. The cutting tool is positioned on the support surface with a cutting bit of the cutting tool extending downwardly from the cutting tool, through the opening through the support surface and into the central hole of the base plate. The coil springs and the support surface of the body position a distal end of the cutting bit above the bottom surface of the base plate. This enables the base plate to be moved from one position of the base plate relative to the work surface into which a cutting operation is to be performed, to a second position of the base plate relative to the work surface into which a cutting operation is to be performed.

The operator slides the cutting drill motor and counterbalance apparatus across the surfaces of the drill jigs and/or drill bushings until the cutting tool drill motor and counterbalance apparatus are located above a desired drill jig and/or drill bushing. The operator then pushes down on the cutting tool drill motor to overcome the spring force of the coil springs, and thus indexes the cutting tool drill motor into the selected desired drill bushing. The operator then locks the cutting tool drill motor into the selected drill bushing. This locking of the cutting tool drill motor to the selected drill bushing maintains a compression of the counterbalance coil springs, and requires no further downward application of force by the operator.

The operator then powers on the cutting tool drill motor, which rotates the cutting bit of the cutting tool drill motor, advances the rotating cutting bit into the work surface of the aircraft component into which the cutting operation is being performed, then retracts the rotating cutting bit from the hole formed and powers off the cutting tool drill motor. The operator then unlocks the cutting tool drill motor from the drill bushing after the hole has been drilled. The spring force of the counterbalance apparatus coil springs then lift the cutting tool drill motor out of the drill bushing. This frees up the cutting tool drill motor and the counterbalance apparatus, enabling the operator to then slide the cutting tool drill motor and counterbalance apparatus across the surfaces of the drill jigs and/or drill bushings to the next desired drill jig and/or drill bushing location.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

Further features of the counterbalance apparatus and its method of use are set forth in the following detailed description and drawings.

DESCRIPTION

The counterbalance system of this disclosure overcomes the disadvantages associated with operators manually moving large motor drills in performing drilling operations in horizontal aircraft component surfaces. The counterbalance system also overcomes the disadvantages of employing counterbalance arms or counterbalance reels to counterbalance the weight of large motor drills used in performing drilling operations in horizontal aircraft component surfaces.

The counterbalance system has an extremely small footprint in the aircraft construction work area when compared to the footprints of counterbalance arms and counterbalance reels. The counterbalance system does not significantly impact or increase the footprint of the operator of the system in the construction area of the aircraft.

The counterbalance system reacts loads, for example the weight of the large motor drill being used in a drilling operation, against an existing structure of the aircraft on which the drilling operation is being performed. In contrast, counterbalance arms and counterbalance reels must react the load of the large motor drill off of a wall of an aircraft assembly building, off of an overhead structure of the aircraft assembly building, or off of some separate support infrastructure of the aircraft assembly building.

The counterbalance system requires a substantially shorter setup time and tear down time than that of counterbalance arms and counterbalance reels.

The counterbalance system requires no additional modification to any existing drilling tools or cutting tools and requires no infrastructure to mount a tool to the counterbalance system.

The counterbalance system dramatically reduces a drill extraction force or lifting force exerted by the operator of the large motor drill in removing the drill from a drill bushing by applying a reaction force to the large motor drill that is equal to the weight of the drill and is normal to the drill path.

Figure 1:
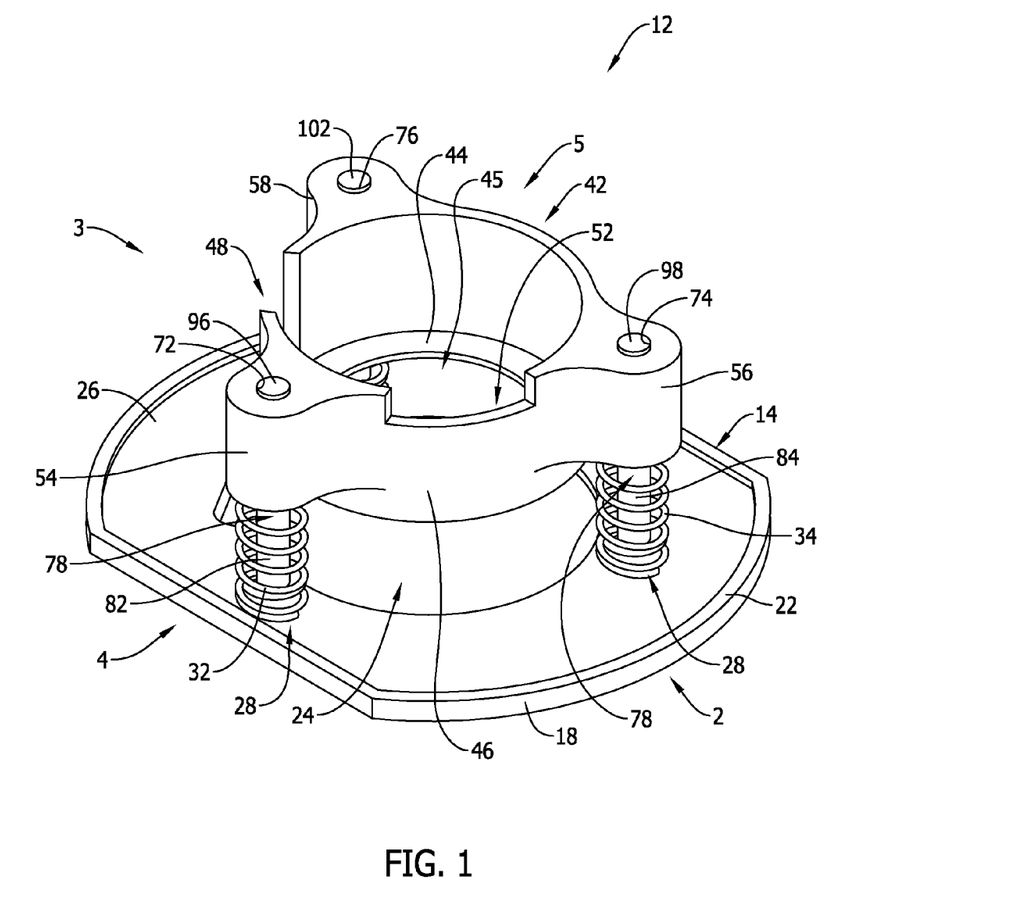
FIG. 1 is a representation of a perspective top view of the counterbalance apparatus of this disclosure.
Figure 2:
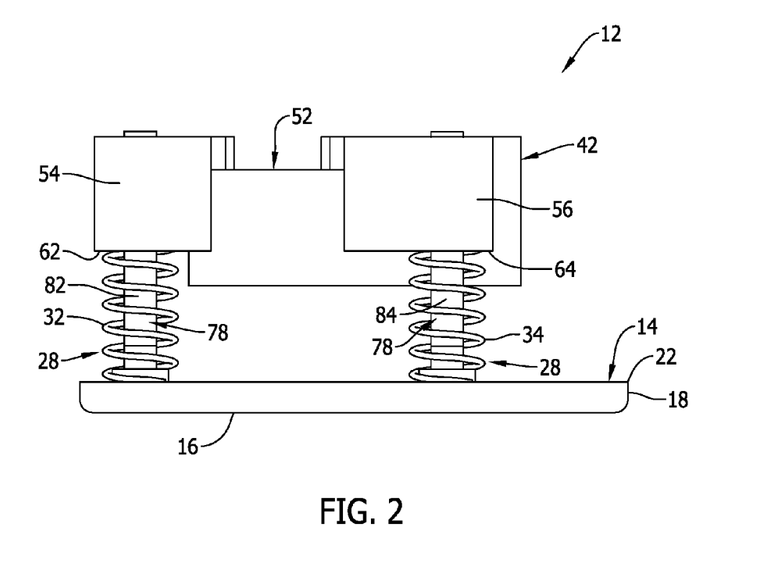
FIG. 2 is a side elevation view of the apparatus from the direction of the arrow "2" in FIG. 1.
Figure 3:
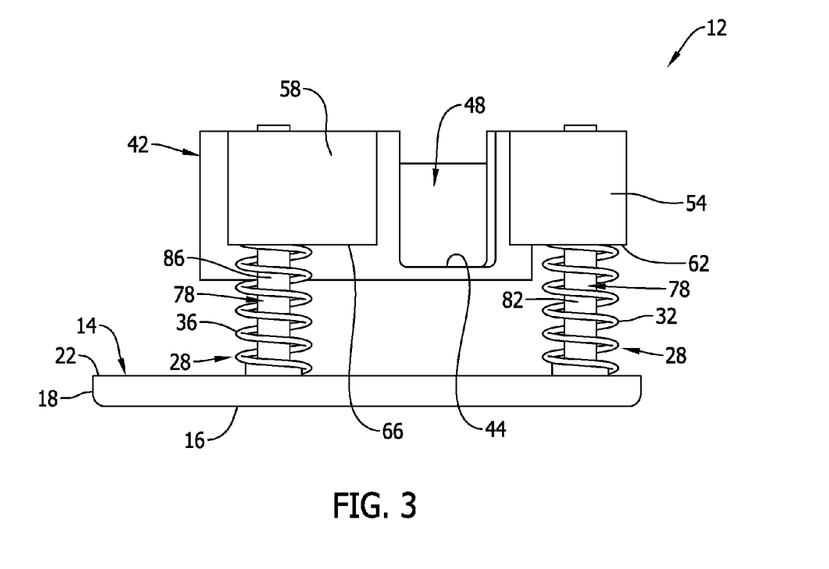
FIG. 3 is a side elevation view of the apparatus from the direction of the arrow "3" in FIG. 1.
Figure 4:
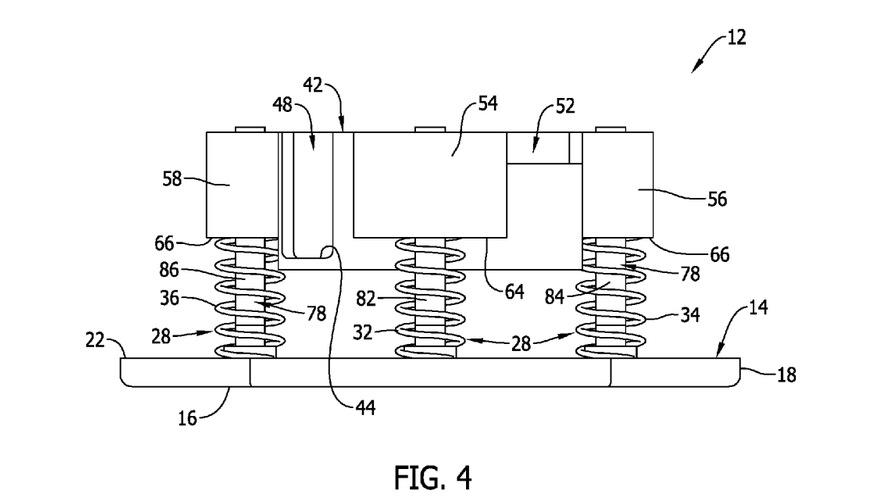
FIG. 4 is a side elevation view of the apparatus from the direction of the arrow "4" in FIG. 1.
Figure 5:
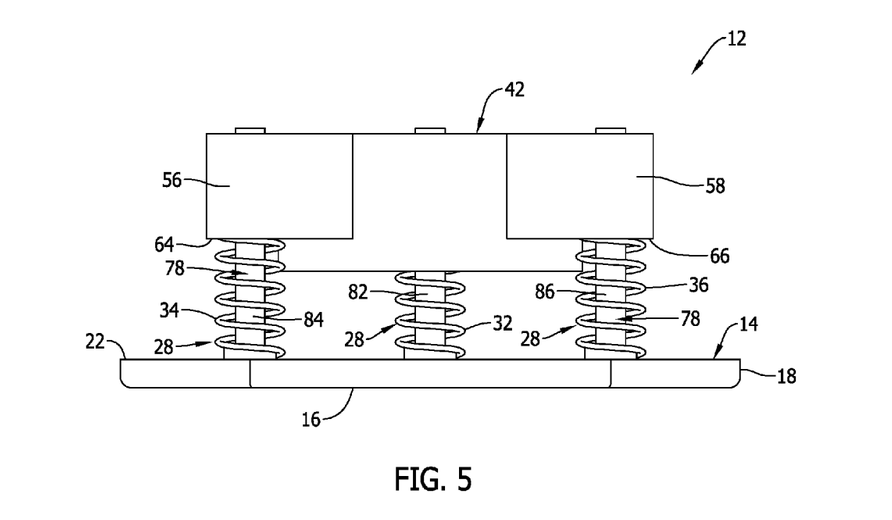
FIG. 5 is a side elevation view of the apparatus from the direction of the arrow "5" in FIG. 1.
Figure 6:
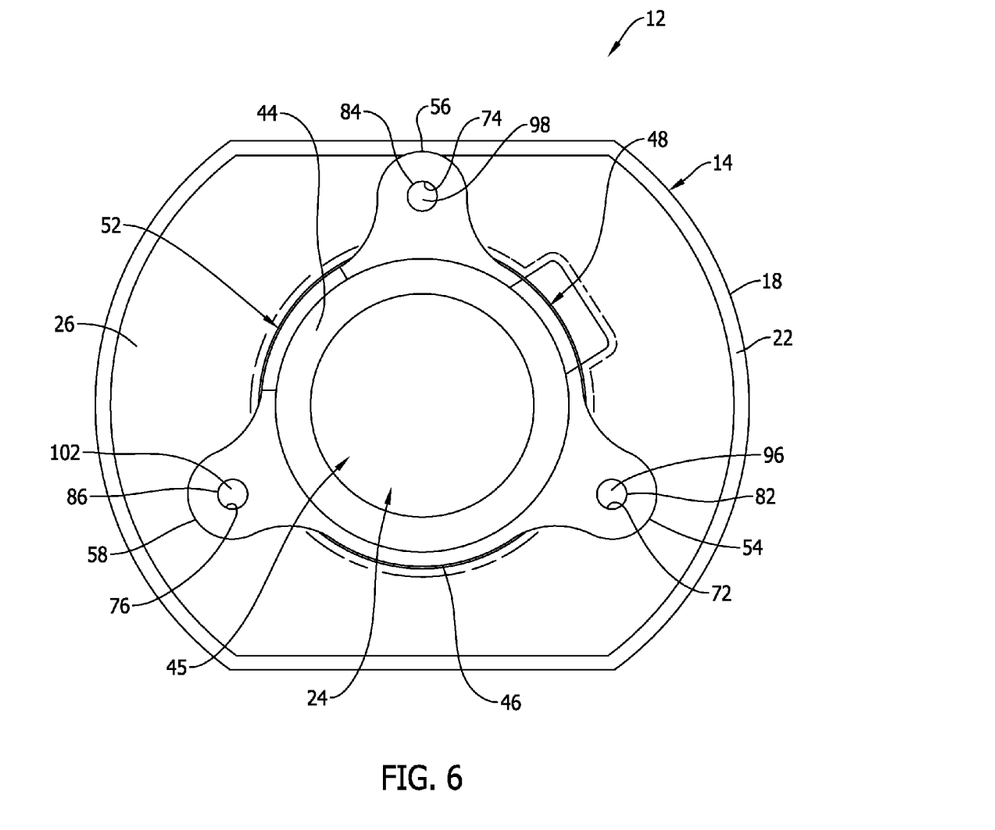
FIG. 6 is a top plan view of the apparatus.
Figure 7:
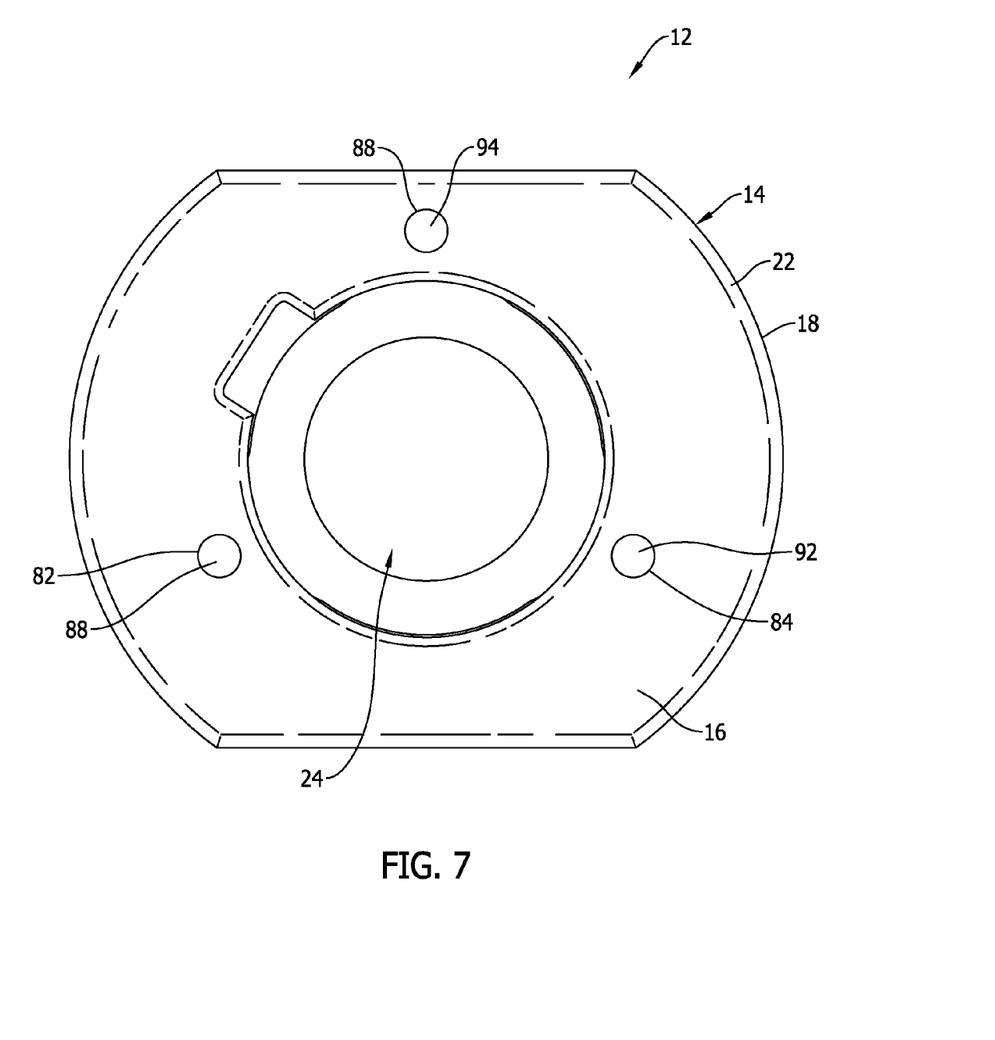
FIG. 7 is a bottom plan view of the apparatus.

FIG. 1 is a representation of the counterbalance apparatus 12 employed in the counterbalance system of this disclosure in performing cutting or drilling operations into an upper horizontally oriented surface of an aircraft component. The different parts of the apparatus 12 to be described can be constructed of any types of materials that provide the parts with sufficient strength to perform the method of using the apparatus in performing cutting or drilling operations into a work surface such as an upper horizontally oriented surface of an aircraft component.

The apparatus 12 includes a base plate 14 that has a flat bottom surface 16. The bottom surface 16 is generally oriented in a horizontal plane when performing cutting operations with the apparatus 12. The base plate 14 has a peripheral edge 16 with a general circular configuration. The peripheral edge 18 of the base plate 14 could have other equivalent configurations to the general circular configuration represented in FIG. 1. The shape and size of the base plate 14 is dictated by the separation distance between adjacent drill bushings for a given application, such that the counterbalance apparatus 12 can react and stay level on top of a plurality of the drill bushings. Referring to FIGS. 2-5, it can be seen that the peripheral edge 18 has a configuration of a curved, upturned lip as the peripheral edge 18 extends from the bottom surface 16 of the base plate 14 to a top edge 22 of the peripheral edge. The flat bottom surface 16 of the base plate 14 and the curved, upturned lip of the peripheral edge 18 facilitate the sliding movement of the base plate across the horizontally oriented work surface into which cutting operations are to be performed, for example, over the top surfaces of drill jigs or bushings, or the top surface of an aircraft component.

A central hole 24 extends through the base plate 14. In use of the counterbalance apparatus 12 with a locking power feed drill motor, the central hole 24 is configured to accommodate the locking nose of the drill motor and the cutting bit. The nose of the drill motor must pass through the central hole 24 of the counterbalance apparatus 12 so that it can index/lock directly with one of the drill bushings across which the counterbalance apparatus 12 slides. The central hole 24 is represented in the drawing figures as having a general circular configuration. However, the central hole 24 could have other equivalent configurations.

The base plate 14 has a top surface 26 that extends around the central hole 24. The top surface 26 is represented as a flat surface that extends completely around the central hole 24. The top surface 26 could have other configurations and it is not necessary that the top surface extend completely around the central hole 24.

A biasing device 28 is provided on the top surface 26 of the base plate 14. The biasing device 28 is configured to exert a biasing force upwardly away from the top surface 26 of the base plate 14. In the counterbalance system of this disclosure, the biasing device 28 is provided by a plurality of coil springs 32, 34, 36 that are fixed to the top surface 26 of the base plate 14. The coil springs 32, 34, 36 are equally spatially arranged around the central hole. Other equivalent arrangements of the springs 32, 34, 36 could also be employed. The coil springs 32, 34, 36 extend upwardly from the top surface 26 along center axes (not shown) of the springs that are perpendicular to the bottom surface 16 of the base plate 14. Each of the coil springs 32, 34, 36 extend upwardly from the top surface 26 to top ends of the springs (not shown) that are positioned in a plane that is substantially parallel with the bottom surface 16 of the base plate 14.

A body 42 is fixed to the top ends of the coil springs 32, 34, 36. As represented in the drawing figures, the body 42 has a general cylindrical configuration. However, the body could have other equivalent configurations. The body 42 has a support surface 44 inside the body. The support surface 44 is configured to support a cutting tool on the support surface, such as a large motor drill. As represented in the drawing figures, the support surface 14 has a general annular configuration with an opening 45 through the support surface. The support surface 44 could have other equivalent configurations. The body 42 also has a side wall 46 that extends upwardly from the support surface 44.

As represented in the drawing figures, the side wall 46 has a general cylindrical configuration and extends upwardly from a radially outer edge of the support surface 44. The side wall 46 has a specific configuration to engage with a cutting tool, such as a large motor drill, to securely position the drill relative to the body 42. The side wall 46 represented in the drawing figures is configured to engage around more than half of the housing of a drill used with the apparatus 12. The side wall 46 is shown having a pair of notches 48, 52 in the side wall. These notches 48, 52 are specifically positioned in the side wall 46 to accommodate portions of a large motor drill in the notches when the body support surface 44 supports the drill and the side wall 46 engages around an outer periphery of the housing of the drill.

A plurality of lobes 54, 56, 58 project radially outwardly from the body side wall 46. There are three lobes 54, 56, 58 represented on the body 42 in the drawing figures. The lobes 54, 56, 58 are spatially arranged around the body side wall 46 to correspond to the positions of the three coil springs 32, 34, 36 that project upwardly from the top surface 26 of the base plate 14. Bottom surfaces 62, 64, 66 of the respective three lobes 54, 56, 58 are fixed to the top ends of the respective coil springs 32, 34, 36. The bottom surfaces 62, 64, 66 of the three lobes 54, 56, 58 could be provided with cavities that receive the top ends of the coil springs 32, 34, 36 in fixing the coil springs to the lobes. Other equivalent means of securing the top ends of the coil springs 32, 34, 36 to the respective lobe bottom surfaces 62, 64, 66 could also be employed. The three lobes 54, 56, 58 have respective cylindrical bores 72, 74, 76 that extend completely through the lobes. The cylindrical bores 72, 74, 76 are axially aligned with the center axes (not shown) of the respective coil springs 32, 34, 36.

An alignment device 78 is provided between the base plate 14 and the body 42. In the counterbalance system of this disclosure, the alignment device 78 is provided by a plurality of guide rods 82, 84, 86. Each of the guide rods 82, 84, 86 has a cylindrical length that extends between bottom ends 88, 92, 94 of the respective guide rods and top ends 96, 98, 102 of the respective guide rods. The bottom ends 88, 92, 94 of the respective guide rods 82, 84, 86 are secured to the top surface 26 of the base plate 14 inside of the respective coil springs 32, 34, 36. The guide rod 82, 84, 86 cylindrical lengths that are parallel and extend through the respective lobe cylindrical bores 72, 74, 76. The guide rods 82, 84, 86 have cylindrical exterior surfaces that are dimensioned to fit in sliding engagement inside the respective lobe cylindrical bores 72, 74, 76. Thus, the guide rods 82, 84, 86 mount the body 42 on the guide rods for reciprocating movements of the body on the guide rods relative to the base plate 14.

The coil springs 32, 34, 36, when not compressed, position and hold the body 42 in a first position of the body relative to the base plate 14 where the body is spaced a first distance from the base plate. The coil springs 32, 34, 36, when compressed in response to a downward directed load or force exerted on the body 42, position and hold the body in a second position relative to the base plate 14 where the body is spaced a second distance from the base plate. The second distance is smaller than the first distance.

The support surface 44 of the body 42, the coil springs 32, 34, 36 and the guide rods 82, 84, 86 are configured to support a cutting tool on the support surface 44, such as a large motor drill, with the coil springs not being compressed. The combined spring force of the coil springs 32, 34, 36 is sufficient to support the weight of the drill without the springs being compressed. The support surface 44 of the body 42, the coil springs 32, 34, 36 and the guide rods 82, 84, 86 are configured to support the cutting tool on the support surface at the second position of the body relative to the base plate 14 in response to a downward directed load exerted on the cutting tool that is transmitted through the support surface and body to the coil springs that compresses the coil springs.

In use of the counterbalance system, the bottom surface 16 of the base plate 14 is positioned on a work surface of an aircraft component where a cutting operation is to be performed. For example, referring to FIGS. 8-10, the bottom surface 16 of the base plate 14 could be positioned on the tops of drill jigs or bushings 104 through which a cutting operation is to be performed on a surface 106 of an aircraft component.

Figure 8:
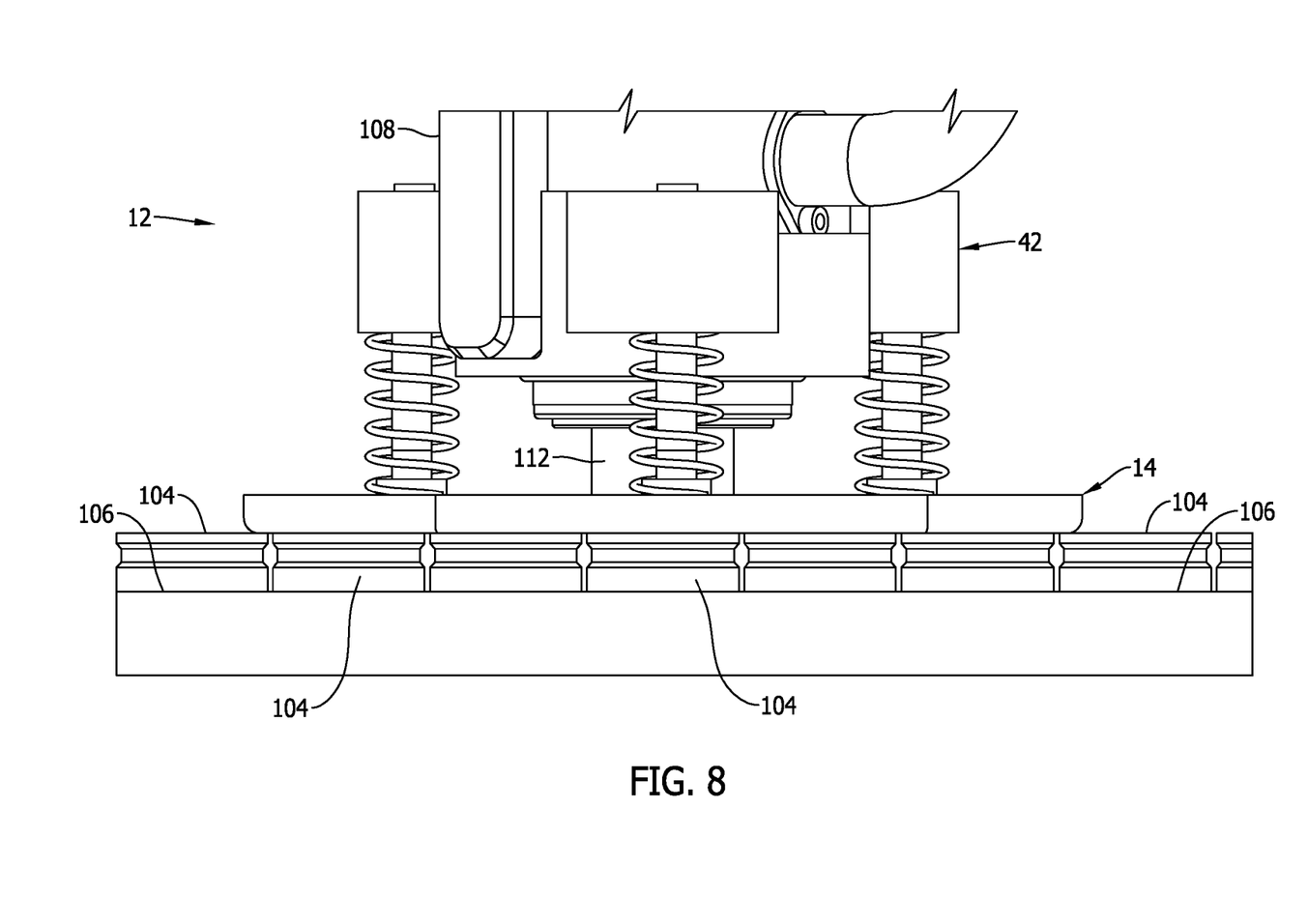
FIG. 8 is a side elevation view of the counterbalance apparatus supporting a cutting tool above a work surface into which cutting operations are to be performed.

A cutting tool 108, such as an orbital, power feed drill motor, is then positioned on and supported by the support surface 44 of the body 42. This is represented in FIG. 8. The cutting tool 108 is positioned on the support surface 44 with a cutting bit 112 of the cutting tool extending downwardly from the cutting tool, through the opening through the support surface 44 and into the central hole 24 of the base plate 14. The coil springs 32, 34, 36 and the support surface 44 of the body 42 position a distal end of the cutting bit 112 above the bottom surface 16 of the base plate 14 resting on the tops of the drill jigs or bushings 104. This enables the base plate 14 to slide across the tops of the drill jigs or bushings 104 when moving the apparatus 12 and cutting tool 108 from one position of the apparatus and cutting tool relative to the work surface 106 into which a cutting operation is to be performed, to a second position of the apparatus and cutting tool relative to the work surface into which a subsequent cutting operation is to be performed. The flat bottom surface 16 of the base plate 14 and the upturned peripheral edge 18 of the base plate facilitate the sliding movement of the base plate across the tops of the drill jigs or bushings 104.

Figure 9:
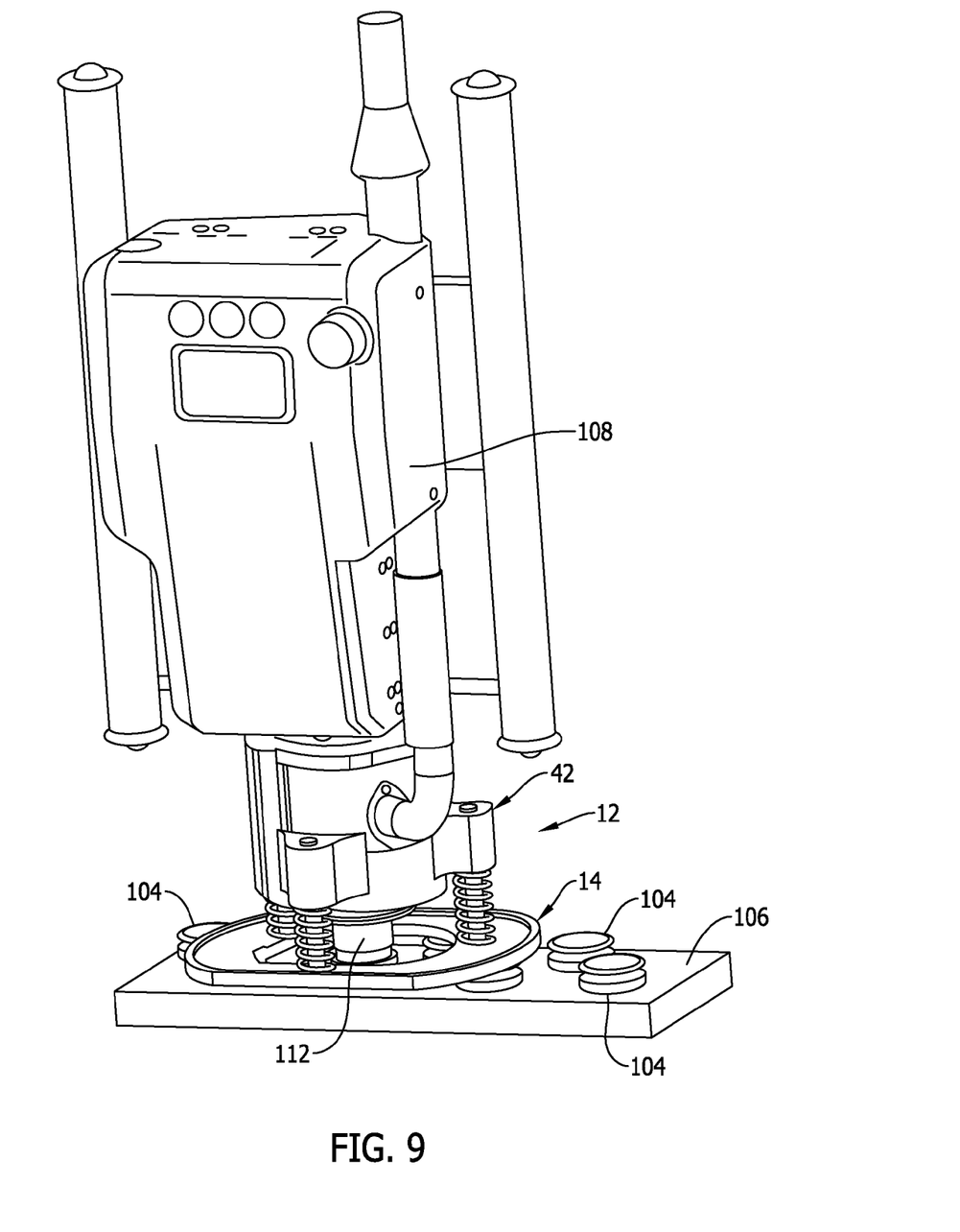
FIG. 9 is a perspective view of the counterbalance apparatus supporting the cutting tool above the work surface into which cutting operations are to be performed.
Figure 10:
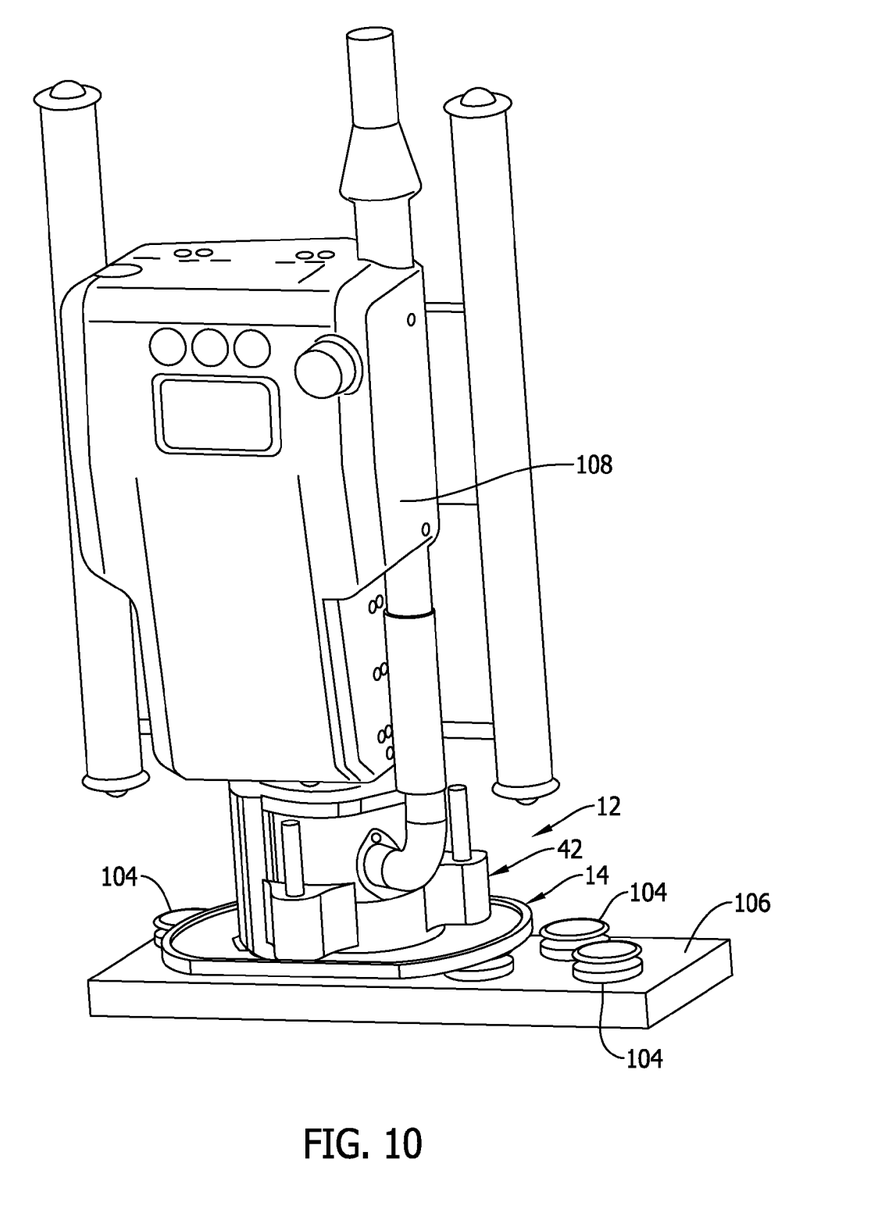
FIG. 10 is a perspective view of the counterbalance apparatus with a drill motor mounted in the counterbalance apparatus, with the counterbalance apparatus in a fully compressed state.

The operator slides the cutting tool 108 and counterbalance apparatus 12 across the surfaces of the drill jigs and/or drill bushings 104 until the cutting tool 108 and the counterbalance apparatus 12 are located above a desired drill jig and/or drill bushing 104. This is represented in FIG. 9. The operator then pushes down on the cutting tool 108 to overcome the spring force of the coil springs 32, 34, 36, and thus indexes the cutting tool into the selected desired drill bushing 104. In this state, the nose of the drill motor protrudes below the bottom surface 16 of the base plate 14 such that the drill motor can be locked into the drill bushing. The operator then locks the cutting tool into the selected drill bushing 104. This locking of the cutting tool 108 to the selected drill bushing 104 maintains a compression of the coil springs 32, 34, 36, and requires no further downward application of force by the operator.

The operator then powers on the cutting tool 108, which rotates the cutting bit 112 of the cutting tool 108, advances the rotating cutting bit 112 through the drill bushing 104 and into the work surface 106 of the aircraft component into which the cutting operation is being performed, then retracts the rotating cutting bit 112 from the hole formed and powers off the cutting tool 108. The operator then unlocks the cutting tool 108 from the drill bushing 104 after the hole has been drilled. The spring force of the counterbalance apparatus coil springs 32, 34, 36 then lifts the cutting tool 108 out of the drill bushing 104. This frees up the cutting tool 108 and the counterbalance apparatus 12, enabling the operator to then slide the cutting tool 108 and counterbalance apparatus 12 across the surfaces of the drill jigs and/or drill bushings to the next desired drill jig and/or drill bushing location.

As various modifications could be made in the construction of the apparatus and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

What is claimed:

1. A counterbalance apparatus for cutting operations on a horizontally oriented surface, the apparatus comprising:
a base plate having a bottom surface that is flat;
a central hole through the base plate, the central hole is configured to receive a cutting bit of a cutting tool therethough;
a spring extending upwardly from the base plate, the spring being moveable between a not compressed position where the spring extends a first distance from a top surface of the base plate and a compressed position where the spring extends a second distance from the top surface, the second distance being smaller than the first distance; and,
a body on the spring, the body having a support surface configured to support the cutting tool, wherein when the spring is in the not compressed position, the spring positions and holds the body in a first position relative to the base plate where the body is spaced a first distance from the base plate, and wherein when the spring is moved to the compressed position in response to a downwardly directed load exerted on the body, the spring positions and holds the body in a second position relative to the base plate where the body is spaced a second distance from the base plate, the second distance being smaller than the first distance, wherein;
the base plate bottom surface is configured to slide over tops of drill bushings when the body is in the first position; and,
the central hole is configured to have the cutting tool inserted therethrough to lock the cutting tool to a drill bushing when the body is in the second position.

2. The apparatus of claim 1, wherein:
the support surface and the spring are configured to support the cutting tool on the support surface at the first position of the body with the spring in the not compressed position of the spring, and the support surface and the spring are configured to support the cutting tool on the support surface at the second position of the body with the spring in the compressed position of the spring in response to a downwardly directed load exerted on the cutting tool that exerts the downwardly directed load on the body.

3. The apparatus of claim 2, wherein:
an opening through the support surface of the body, the support surface being configured to support the cutting tool on the support surface with the cutting bit extending downwardly through the opening in the support surface and into the central hole through the base plate, where the spring in the not compressed position of the spring relative to the base plate and the support surface of the body position the distal end of the cutting bit above the bottom surface of the base plate.

4. The apparatus of claim 3, wherein:
the spring being one of at least three like coil springs that are fixed to the top surface of the base plate, each coil spring of the at least three coil springs having a top end; and,
the body being fixed to the top ends of the at least three coil springs.

5. The apparatus of claim 4, wherein:
the at least three coil springs being equally spatially arranged around the central hole through the base plate and the opening through the support surface.

6. The apparatus of claim 1, wherein:
the body having at least one side wall extending upwardly from the support surface, the side wall is configured to engage against a portion of a cutting tool supported on the support surface and position the cutting tool relative to the support surface without being attached to the cutting tool.

7. The apparatus of claim 6, wherein:
the side wall being configured to engage around at least half of a cutting tool supported on the support surface and position the cutting tool relative to the support surface.

8. The apparatus of claim 1, wherein:
the base plate having a peripheral edge surface that is curved upwardly from the bottom surface of the base plate to a top end of the peripheral edge surface.

9. The apparatus of claim 4, wherein:
the at least three coil springs having a combined spring force that, when a cutting tool is supported on the support surface and no external load is exerted on the cutting tool, the at least three coil springs are in the not compressed positions of the at least three coil springs and position the distal end of the cutting bit above the bottom surface of the base plate.

10. The apparatus of claim 1, wherein:
an alignment device fixed to the top surface of the base plate, the alignment device extending upwardly from the top surface and through the body, the alignment device being configured to hold the body in alignment with the base plate as the body is moved toward the base plate causing the spring to move to the compressed position of the spring, and the body is moved away from the base plate by the spring moving from the compressed position of the spring toward the not compressed position of the spring.

11. A counterbalance apparatus for cutting operations in horizontally oriented surfaces, the apparatus comprising:
a base plate, having a bottom surface that is flat;
a central hole through the base plate, the central hole is configured to receive a cutting bit of a cutting tool therethrough;
a guide rod extending upwardly from the base plate along a line that is perpendicular to the bottom surface of the base plate;
a body mounted on the guide rod for reciprocating movements along the guide rod between a first position of the body and a second position of the body relative to the base plate, the body being positioned a first distance from the base plate in the first position of the body and the body being positioned a second distance from the base plate in the second position of the body, the second distance being smaller than the first distance, the guide rod positioning and holding the body directly above the top surface of the base plate, the body having a support surface with an opening through the support surface, the support surface being configured to support the cutting tool with the cutting bit extending downwardly from the cutting tool, through the opening through the support surface and into the central hole through the base plate where the guide rod and the support surface of the body position a distal end of the cutting bit in a first position of the distal end of the cutting bit relative to the base plate above the bottom surface of the base plate; and,
a biasing device on the base plate, the biasing device positioning the body at the first position of the body when no external load is exerted on the body, and the biasing device allowing the body to move from the first position of the body to the second position of the body in response to a external load exerted downwardly on the body, wherein;
the base plate bottom surface is configured to slide over tops of drill bushings when the body is in the first position; and,
the central hole is configured to have the cutting tool inserted therethrough to lock the cutting tool to a drill bushing when the body is in the second position.

12. The apparatus of claim 11, wherein:
the guide rod being one of at least three guide rods that are fixed to the top surface of the base plate, the at least three guide rods being parallel.

13. The apparatus of claim 12, wherein:
the at least three guide rods being equally spatially arranged around the central hole through the base plate.

14. The apparatus of claim 13, wherein:
the biasing device comprising at least three coil springs that are spatially arranged around the central hole through the base plate and the opening through the support surface.

15. The apparatus of claim 11, wherein:
the body having at least one side wall extending upwardly from the support surface, the side wall is configured to engage against a portion of a cutting tool supported on the support surface and position the cutting tool relative to the support surface without being attached to the cutting tool.

16. The apparatus of claim 15, wherein:
the side wall being configured to engage around at least half of a cutting tool supported on the support surface and position the cutting tool relative to the support surface.

17. The apparatus of claim 11, wherein:
the base plate having a peripheral edge surface that is curved upwardly from the bottom surface of the base plate to a top end of the peripheral edge surface.

18. A method of counterbalancing a cutting tool, the method comprising:
positioning a base plate of a counterbalance apparatus at a first position on a work surface into which a cutting operation is to take place by sliding the base plate over drill bushings on the work surface;
biasing a body of the counterbalance apparatus away from the base plate;
positioning the cutting tool on the body of the counterbalance apparatus without attaching the cutting tool to the body;
exerting a downwardly directed force on the cutting tool and moving the cutting tool downward against the biasing of the body away from the base plate to a cutting position of the cutting tool; and,
performing the cutting operation into the work surface.

19. The method of claim 18, further comprising:
removing the downwardly directed force exerted on the cutting tool;
biasing the body of the counterbalance apparatus away from the base plate; and,
moving the cutting tool away from the cutting position by sliding the base plate over the drill bushings.

20. he method of claim 19, further comprising:
positioning the base plate of the counterbalance apparatus at a second position on the work surface into which a second cutting operation is to take place by sliding the base plate over the drill bushings.

* * * * *

UNITED STATES PATENT AND TRADEMARK OFFICE
CERTIFICATE OF CORRECTION

PATENT NO. : 9,789,577 B2
APPLICATION NO. : 15/010580
DATED : October 17, 2017
INVENTOR(S) : Jerome C. Kraft and Andrew P. Newton It is certified that error appears in the above-identified patent and that said Letters Patent is hereby corrected as shown below:

In Claim 20, Line 1, "he" is changed to --The--.

Signed and Sealed this
Fifth Day of December, 2017

Joseph Matal
*Performing the Functions and Duties of the*
*Under Secretary of Commerce for Intellectual Property and*
*Director of the United States Patent and Trademark Office*